US006625579B1

(12) United States Patent
Komai

(10) Patent No.: US 6,625,579 B1
(45) Date of Patent: *Sep. 23, 2003

(54) ELECTRONIC CASH REGISTER WHEREIN SPECIAL REGISTRATION PROCESSES ARE SPECIFIED BY CHANGING PRODUCT DEPARTMENT VALUES

(75) Inventor: Kensaku Komai, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 718 days.

(21) Appl. No.: 09/022,193

(22) Filed: Feb. 11, 1998

(30) Foreign Application Priority Data

Feb. 12, 1997 (JP) .............................. 9-028104

(51) Int. Cl.[7] ............................... G06F 17/60
(52) U.S. Cl. ........................... 705/20; 705/18
(58) Field of Search ............... 705/18–16, 17, 705/20, 21

(56) References Cited

U.S. PATENT DOCUMENTS

| 4,570,223 | A |   | 2/1986  | Yoshimoto .................. 364/405 |
|-----------|---|---|---------|--------------------------------------|
| 5,053,957 | A | * | 10/1991 | Suzuki ....................... 364/405 |
| 5,510,979 | A |   | 4/1996  | Moderi et al. ............. 364/405 |
| 5,717,866 | A | * | 2/1998  | Naftzger ..................... 705/14 |
| 5,774,872 | A | * | 6/1998  | Golden et al. ............... 705/19 |
| 5,799,283 | A | * | 8/1998  | Francisco et al. ........... 705/19 |
| 5,873,069 | A | * | 2/1999  | Reuhl et al. ................. 705/20 |
| 5,875,433 | A | * | 2/1999  | Francisco et al. ........... 705/26 |
| 5,924,077 | A | * | 7/1999  | Beach et al. ................. 705/10 |
| 5,924,078 | A | * | 7/1999  | Naftzger ..................... 705/16 |

| 6,078,899 | A | * | 6/2000 | Francisco et al. ............ 705/19 |

FOREIGN PATENT DOCUMENTS

| DE | 30 38 399 A1 |   | 4/1981  |
|----|--------------|---|---------|
| EP | 0 313 376 A2 |   | 4/1989  |
| EP | 0 507 241 A2 |   | 10/1992 |
| GB | 2 089 547 A  |   | 6/1982  |
| GB | 2142759 A    |   | 1/1985  |
| JP | 63-300392    | * | 12/1988 |
| JP | 64-53297     | * | 3/1989  |
| JP | 2-239397 A   |   | 9/1990  |
| JP | 3-74797      | * | 3/1991  |
| JP | 5-334563 A   |   | 12/1993 |
| WO | WO 97/08638  | * | 3/1997  |

OTHER PUBLICATIONS

Schwadel, Francine. "Myriad Factors Make or Break Christmas Sales." Asian Wall Street Journal, p. 2, Dec. 10, 1991.*

* cited by examiner

Primary Examiner—Tariq R. Hafiz
Assistant Examiner—Susanna Meinecke-Díaz
(74) Attorney, Agent, or Firm—David G. Conlin; Steven M. Jensen; Edwards & Angell, LLP

(57) ABSTRACT

A purpose of this invention is to totalize, store, and check special sales information concerning special customers or special purchasers, etc. Sales information of registered merchandise is totalized and stored in an area corresponding to a department code of a department file table specified in a product department, by an ordinary registration mode. When special registration process is specified by depressing a department shift key, a value of the product department is changed to a value specified in a department shift table by a special registration mode and the sales information is totalized and stored in an area corresponding to the department code of the department file table specified by the thus changed value. Accordingly, the special sales information can be totalized as ordinary sales information, and can be stored separately from the ordinary sales information.

7 Claims, 16 Drawing Sheets

| PLU CODE | AMOUNT TOTALIZER | QUANTITY TOTALIZER | UNIT PRICE | PRODUCT NAME | PRODUCT DEPARTMENT |
|---|---|---|---|---|---|
| 0001 | 1200 | 10 | 120 | NOTEBOOK | 01 (→18) |
| 0002 | | | | | |
| 0003 | | | | | |
| ⋮ | ⋮ | ⋮ | ⋮ | ⋮ | ⋮ |
| 0098 | | | | | |
| 0099 | | | | | |
| 0100 | | | | | |

FIG. 8B

| DEPARTMENT CODE | AMOUNT TOTALIZER | QUANTITY TOTALIZER | UNIT PRICE | PRODUCT NAME |
|---|---|---|---|---|
| 01 | 1200 | 10 | 120 | STATIONERY |
| 02 | | | | |
| 03 | | | | |
| ⋮ | ⋮ | ⋮ | ⋮ | ⋮ |
| 18 | 120 | 1 | 120 | STATIONERY |
| 19 | | | | |
| 20 | | | | |

FIG. 12

[2][5][1][1] → [.] → [X] → [9][8][7][6] → [CASH/TENDER]
JOB#                    SPECIAL PERMISSION
                        CODE

FIG. 13

[2][1][9][0] → [.] → [X]
JOB#

→ [1] → [X] → [1][8] → [SUBTOTAL] → [CASH/TENDER]
DEPARTMENT SHIFT  DEPARTMENT
KEY CODE          CODE

OPERATOR
IDENTIFICATION
CODE

| OPERATION | DISPLAY | PRINT |
|---|---|---|
| 001 [OPERATOR] | OPERATOR 001 | |
| [1] | NOTEBOOK<br>120 | NOTEBOOK  NET¥120<br>TAX  ¥4 |
| CASH/TENDER | CASH<br>124 | CASH  ¥124 |

FIG. 16

[0][0][1] → [OPERATOR] → [DEPARTMENT SHIFT KEY] → [PRODUCT KEY] → ...... → [CASH/TENDER]

OPERATOR
IDENTIFICATION
CODE

FIG. 17

| OPERATION | DISPLAY | PRINT |
|---|---|---|
| 001 [OPERATOR] | OPERATOR 001 | |
| [DEPARTMENT SHIFT 1] | DEPARTMENT SHIFT 1 | ** DEPARTMENT SHIFT 1 ** |
| [1] | NOTEBOOK    120 | NOTEBOOK    NET¥120 |
| | | TAX    ¥4 |
| CASH/TENDER | CASH    124 | CASH    ¥124 |

FIG. 18

| OPERATION | DISPLAY |
|---|---|
| 002 [OPERATOR] | OPERATOR 002 |
| [DEPARTMENT SHIFT 1] | DEPARTMENT SHIFT PROHIBITED |

ELECTRONIC CASH REGISTER WHEREIN SPECIAL REGISTRATION PROCESSES ARE SPECIFIED BY CHANGING PRODUCT DEPARTMENT VALUES

BACKGROUND OF THE INVENTION

1. Field of the Invention

The present invention relates to an electronic cash register that registers sales of merchandise.

2. Description of the Related Art

An electronic cash register (hereinafter sometimes referred to as a "cash register"), generally called as an ECR (Electronic Cash Register), is an apparatus that is placed in a retail store or the like and used to electronically register sales of merchandise, that is, to electronically perform processes such as recording the sales of merchandise, calculations, and cash management. Basic functions of the cash register are to record sales concerning transactions of merchandise and to issue receipts and slips. There are also cash registers capable of realizing a POS (Point Of Sale) system.

In the cash registers capable of realizing a POS system, so-called PLU (Price Look Up) is often employed wherein, when registering a sale, a price is not entered from a price tag, but only a product identification code given to each individual article of merchandise is entered, and from a unit price table which is entered and stored in advance, and in which reference identification codes and unit prices are associated with each other, a unit price corresponding to the entered product identification code is read and registered.

One such prior art electronic cash register is disclosed, for example, in Japanese Unexamined Patent Publication JP-A 2-239397 (1990). The cash register disclosed therein is designed to calculate tax amounts. More specifically, it provides a category-specific file that stores a type of tax common to all items of merchandise and that has a tax type area for storing tax types associated with category codes for categorizing all items of merchandise, and sets tax types other than the common tax type in the tax type area. In executing a registration process, if the tax type associated with the category code of the product to be registered is set in the tax type area of the category-specific file, the registration process is performed using that tax type in the tax type area of the category-specific file; if the tax type is not set, the registration process is performed using the common tax type.

Apart from the category-specific file, the abovementioned cash register provides a product-specific file that stores the category code to which the product belongs corresponding to one of product codes assigned to individual items of merchandise and that has a tax type area for storing tax types, and sets tax types other than the common tax type in each tax type area of the category-specific file and the product-specific file. In executing the registration process, if the tax type associated with the product code of the product to be registered is set in the tax type area of the product-specific file, the registration process is performed using the tax type set in the tax type area of the product-specific file. If that tax type is not set in the tax type area of the product-specific file but the tax type associated with the category code of the product to be registered is set in the tax type area of the category-specific file, then the registration process is performed using the tax type stored in the tax type area of the category-specific file. If the tax type of the product is not stored in either of the files, the registration process is performed using the common tax type.

Another prior art electronic cash register is disclosed, for example, in Japanese Unexamined Patent Publication JP-A 5-334564 (1993). In the Publication, the cash register provides a department-specific totalizer having first and second areas where sales data are cumulatively stored for each of department codes by which merchandise is classified. In executing the registration process, the above-mentioned cash register determines whether the product to be registered is ordinary sales product or a special sales product; if it is an ordinary sales product, its sales data is cumulatively stored in the first area of the department-specific totalizer corresponding to the applicable department code, and if it is a special sales product, its sales data is cumulatively in the first and second areas of the department-specific totalizer corresponding to the applicable department code.

According to Japanese Unexamined Patent Publication JP-A 2-239397 (1990) described above, since it is necessary only to preset the common tax type for all products or departments and then set different tax types only for exceptional products or departments, the tax types can be set efficiently. However, in order to store and totalize results of the registration process for each special customer such as an employee or for each special purchaser, a complicated process is required. Storing and totaling the results of the registration process for each of such special customers or purchasers become necessary in case of a different process, for example, for tax declaration.

According to Japanese Unexamined Patent Publication JP-A 5-334564 (1992) described above, even when ordinary sales products and special sales products are classified under the same department code, the sales data for the special sales products only can be totalized on a department by department basis. However, when storing and totaling the results of the registration process for each special customer or purchaser, a complicated process is required.

SUMMARY OF THE INVENTION

An object of the present invention is to provide an electronic cash register wherein results of a process of registering special customers and purchasers and a process of registering other ordinary customers and purchasers can be totalized, stored, and confirmed in an easy and simple manner.

The present invention provides an electronic cash register comprising:

registration means for registering sales information of merchandise;

sales information storage means for storing the sales information; and control means for causing execution of an ordinary registration mode in which the sales information registered by the registration means is supplied to the sales information storage means;

the electronic cash register further comprising:

special registration process specifying means for specifying that special sales information of special products be subjected to a special registration process; and special sales information storage means for storing the special sales information, wherein, when the special registration is specified by the special registration process specifying means, the control means causes execution of a special registration mode in which the sales information registered by the registration means is supplied to the special sales information storage means.

According to the invention, usually the sales information of merchandise registered by the registration means is stored in the ordinary sales information storage means in the ordinary registration mode, but when performing the special registration process is specified, the sales information is stored in the special sales information storage means in the special registration mode. Since the registration process is performed for special customers and purchasers in the same way as the registration process of other ordinary customers and purchasers, the sales information to be registered can be totalized easily and simply. Furthermore, all of the special sales information during a period for which the execution of the special registration process is specified can be stored together separately from the ordinary sales information.

Furthermore the invention is characterized by comprising:
first identification code storage means for prestoring an identification code of a predetermined operator;
second identification code storage means for storing an operator identification code entered in the execution of the special registration mode;
identification code comparing means for comparing the identification codes stored in the first and second identification code storage means with each other; and
special registration mode permitting means for permitting the execution of the special registration mode when the identification codes match with each other.

According to this invention, only predetermined specific operators are permitted to execute the special registration mode, which can prevent the ordinary sales information from being stored in the special sales information storage means or the special sales information from being stored in the ordinary sales information storage means due to an erroneous operation.

Furthermore, the invention is characterized by comprising informing means for informing that the special registration mode is disallowed when the identification codes do not match.

According to this invention, when an operator other than the specific operators has attempted to execute the special registration mode, information that the execution of the special registration mode is disallowed is issued, and therefore an erroneous operation is avoided.

The invention is also characterized by comprising:
first designation code storage means for prestoring a designation code for forcefully executing the special registration mode;
second designation code storage means for storing a designation code entered in the execution of the special registration mode;
designation codes comparing means for comparing the designation codes stored in the first and second designation code storage means with each other; and
special registration mode forceful execution means for forcefully executing the special registration mode if the designation codes match with each other even when the operator identification codes do not match.

According to this invention, even an operator other than the specific operators, can execute the special registration mode if he knows the designation code. Accordingly, an operator, such as a manager who has the authority to know the designation code, can easily execute the special registration mode in case of emergency.

Furthermore, the invention is characterized by comprising output means for outputting the sales information stored in the sales information storage means and the special sales information storage means.

According to this invention, the sales information is output. For example, the sales information is displayed or printed. Accordingly, the operator can easily check results of totalization of the ordinary sales information and the special sales information.

Furthermore the invention is also characterized in that the output means outputs the sales information stored in the special sales information storage means, together with data indicating that the information has been obtained by executing the special registration mode.

According to this invention, it is possible to easily confirm that the output sales information is the special sales information obtained by executing the special registration mode.

BRIEF DESCRIPTION OF THE DRAWINGS

Other and further objects, features, and advantages of the invention will be more explicit from the following detailed description taken with reference to the drawings wherein:

FIG. 2 is a diagram showing a mode switch 10 and a keyboard 11;

FIGS. 8A and 8B are diagrams showing a PLU file table 40 and department file table 39 in a totalizing memory 37 respectively;

FIG. 12 is a diagram showing an operational procedure for setting a special permission code;

FIG. 13 is a diagram showing an operational procedure for setting a department shift table 35;

FIG. 16 is a diagram showing an operational procedure for PLU special registration;

FIG. 17 is a diagram showing an operational procedure example, a display example, and a print example for PLU special registration;

FIG. 18 is a diagram showing an operational procedure example and a display example in case where, in PLU special registration, an identification code stored in the operator memory 33 does not match any of the identification codes prestored in the department shift operation permission memory 34;

DETAILED DESCRIPTION OF THE PREFERRED EMBODIMENTS

Figure 1:
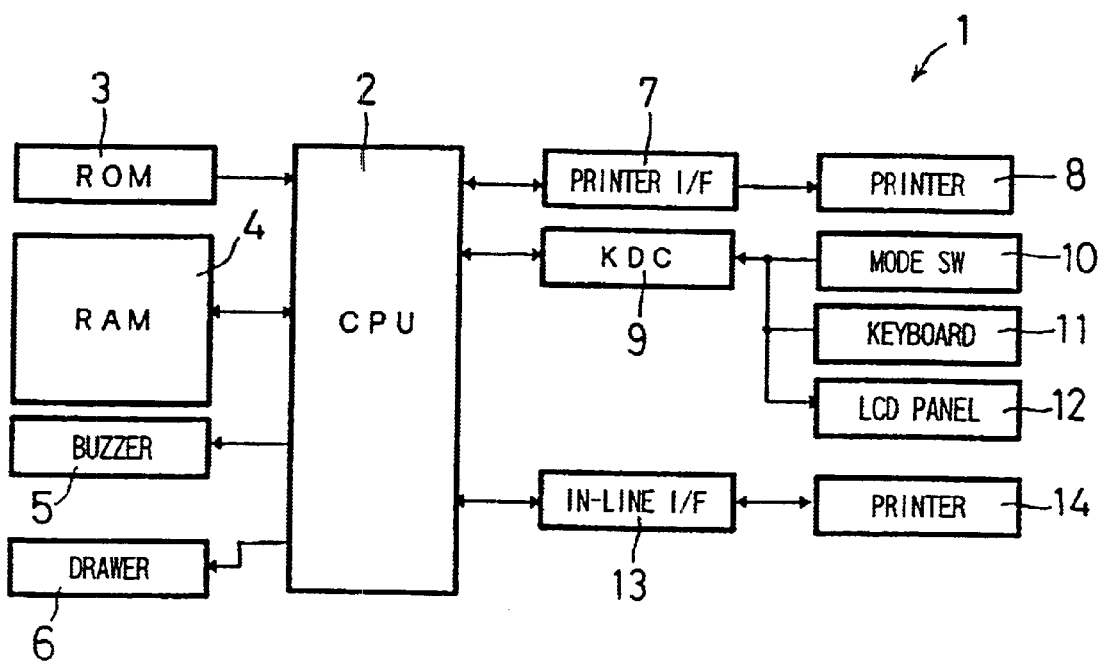
FIG. 1 is a block diagram showing an electrical configuration of an electronic cash register 1 according to one embodiment of the present invention.

Now referring to the drawings, preferred embodiments of the invention are described below.

FIG. 1 is a block diagram showing an electrical configuration of an electronic cash register 1 according to one embodiment of the present invention. The electronic cash register 1 comprises a CPU (central processing unit) 2, a ROM (read only memory) 3, a RAM (random access memory) 4, a buzzer circuit 5, a drawer 6, a printer I/F (interface) circuit 7, a printer 8, a KDC (key display controller) circuit 9, a mode switch 10, a keyboard 11, an LCD (liquid crystal display) panel 12, an in-line I/F circuit 13, and a printer 14.

The CPU 2 controls and supervises the entire operation of the cash register 1 in accordance with microinstructions stored in the ROM 3. The ROM 3 holds microinstructions for controlling the buzzer circuit 5, the drawer 6, the printer I/F circuit 7, the KDC circuit 9, the in-line I/F circuit 13, and other circuits peripheral to the CPU 2. It also holds a table that contains messages to be fixedly displayed on the LCD panel 12 connected via the KDC circuit 9, and messages to be fixedly printed by the printer 8 connected via the printer I/F circuit 7, etc. The RAM 4 is used in operating the cash register 1 in accordance with the microinstructions.

It also stores registered sales information dividing into the one for special customers and the one for ordinary customers.

The buzzer circuit 5 generates various kinds of error sounds. The drawer 6 is used to store cash from sales, change, checks, etc. The printer I/F circuit 7 comprises a printer controller, a driver circuit, and a timing signal circuit, and controls an operation of the printer 8 connected to the circuit 7. The printer 8 prints out data obtained by registration, checking, settling, or other processes on receipt or journal paper.

The mode switch 10, the keyboard 11, and the LCD panel 12 are connected to the KDC circuit 9, which controls operations of these devices. The mode switch 10 is used to select an operation mode from among SET, TIME DISPLAY, REGISTRATION, CHECK, SETTLE, preset in the cash register 1.

The keyboard 11 comprises a plurality of keys; sales information to be registered, data to be set, etc. are entered from the keyboard 11. The LCD panel 12 displays various kinds of input data such as registered sales information. It also displays operating guide information, an error condition due to improper operation, etc.

The printer 14 is connected to the in-line I/F circuit 13, which controls an operation of the printer 14. For example, when the cash register 1 is installed in a dining hall or the like and the printer 14 is placed in the kitchen, order data and the like are transmitted between the CPU 2 and the printer 14 via the in-line I/F circuit 13. The printer 14 prints out order data, etc.

Figure 2:
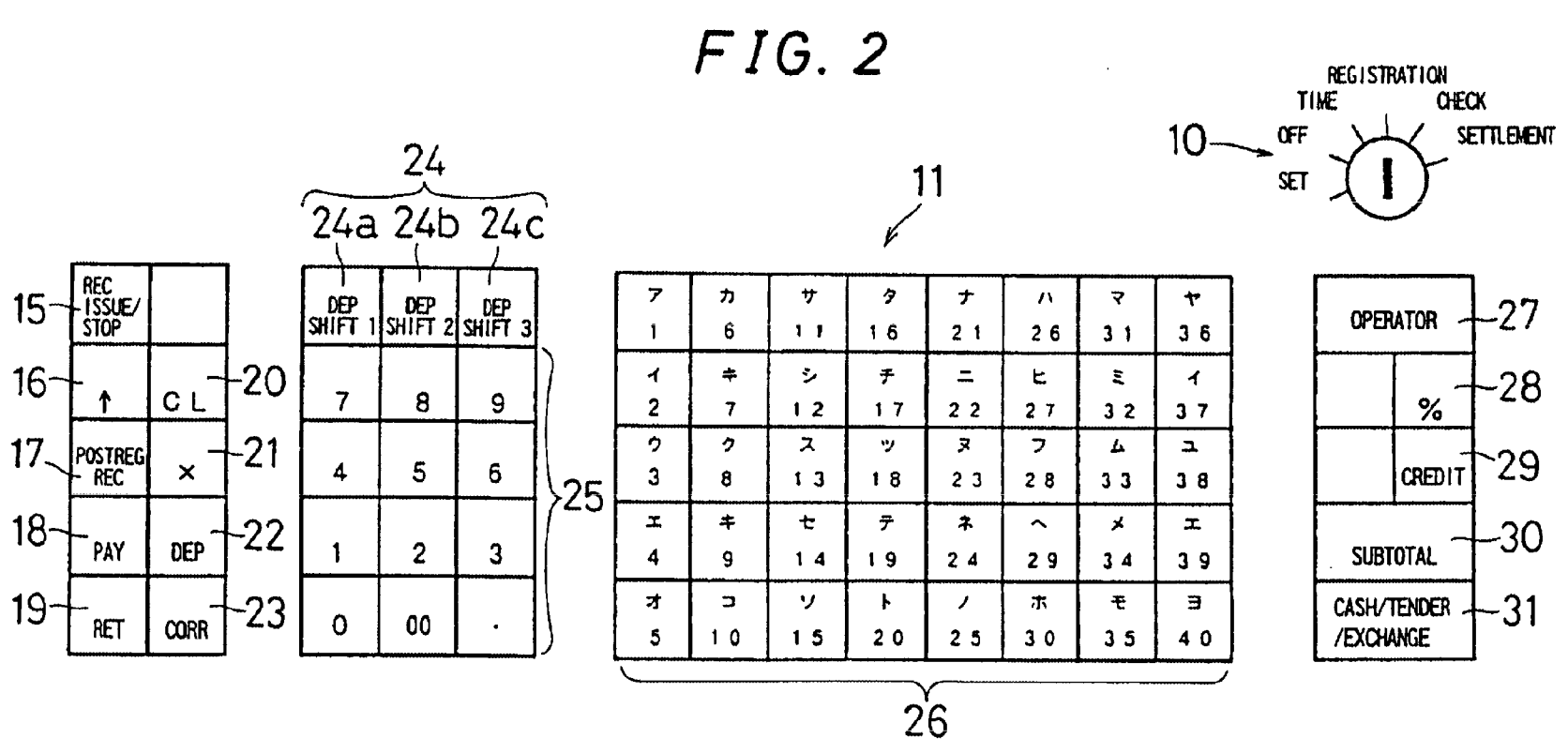

FIG. 2 is a diagram showing the mode switch 10 and the keyboard 11. Various operation modes, such as SET, TIME DISPLAY, REGISTRATION, CHECK and SETTLEMENT, and a power off mode can be selected by the mode switch 10. The keyboard 11 has a plurality of keys 15 to 31.

The RECEIPT ISSUE/STOP key 15 is used to designate an issue of a receipt or a stoppage of the issue. Rolled paper such as receipt or journal paper can be fed by a paper feed key 16. The POST-REGISTRATION RECEIPT key 17 is used to designate the issue of a receipt after completion of a registration. The PAYMENT key 18 is used to designate a payment other than payments from transactions of merchandise.

The RETURN key 19 is used to designate returned merchandise.

The CL key 20 is used to correct errors in the sales information to be registered or data to be set; it can also be used to designate a stoppage of an error beep. The "x" key 21 is used to designate a registration of plural pieces of one item. The "x" key 21 is also used during the setting mode described later. The DEPOSIT key 22 is used to designate that money other than payments for transactions of merchandise has been deposited. The CORRECTION key 23 is used to designate a correction of erroneously registered sales information or erroneously set data.

The plurality of department shift keys 24a to 24c (hereinafter collectively referred to as department shift keys 24 when necessary) are used to designate registering special sales information associated with special customers such as employees and special purchasers separately from ordinary sales information associated with ordinary customers and ordinary purchasers. The plurality of numeric keys 25 are used to enter sales information such as sales amounts and various setting data such as unit price, quantity, and operator identification code. The plurality of product keys 26 are used in the case of a registration process by PLU. The product keys 26 are provided for each of PLU codes associated with products; using each of the keys 26, sales information is registered for each PLU code.

The OPERATION key 27 is used to specify the operator in charge. The "%" key 28 is used to designate a price reduction or price increase. The CREDIT key 29 is used to designate a credit sale. The SUBTOTAL key 30 is used to designate calculating a subtotal and displaying its result. The CASH/TENDER/EXCHANGE key 31 is used to designate a cash sale, cash tendered, and money exchange. The SUBTOTAL key 30 and the CASH/TENDER/EXCHANGE key 31 are also used in the setting mode described later.

Figure 3:
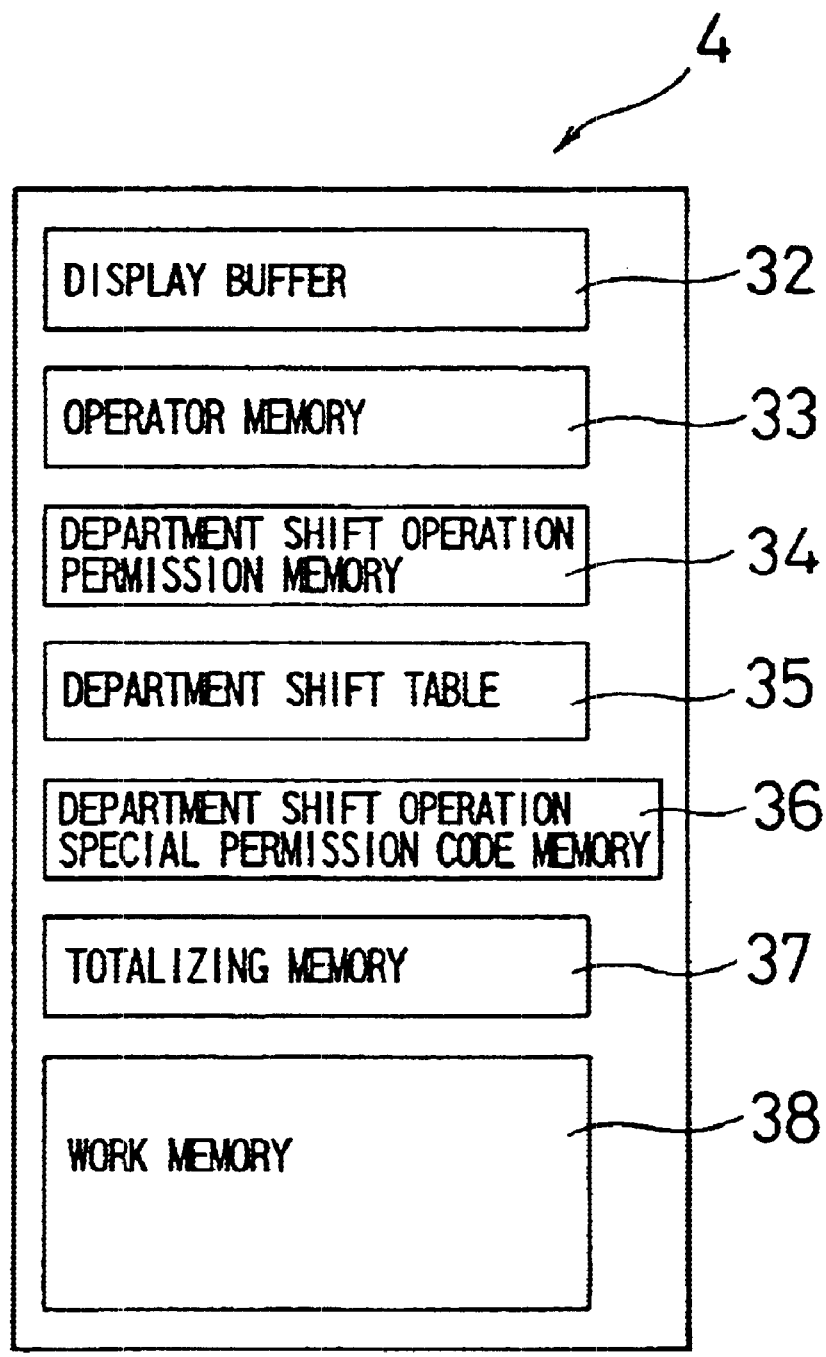
FIG. 3 is a diagram showing an organization of a RAM 4.

FIG. 3 is a diagram showing an organization of the RAM 4. The RAM 4 comprises a display buffer 32, an operator memory 33, a department shift operation permission memory 34, a department shift table 35, a department shift operation special permission code memory 36, a totalizing memory 37, and a work memory 38.

The display buffer 32 is used in displaying data on the LCD panel 12. Sales information, setting data, fixed messages, etc. to be displayed are written to the buffer 32.

The data stored in the display buffer 32 is displayed on the LCD panel 12 under the control of the KDC circuit 9.

Figure 4:
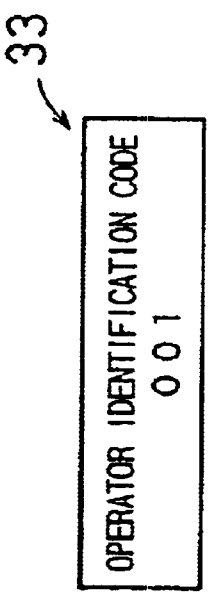
FIG. 4 is a diagram showing an operator memory 33.

The operator memory 33 stores, as shown in FIG. 4, an identification code of the operator presently operating the cash register 1. The identification code is, for example, a three-digit number, and is entered at a beginning of an operation. For example, an identification code "001" is stored.

Figure 5:
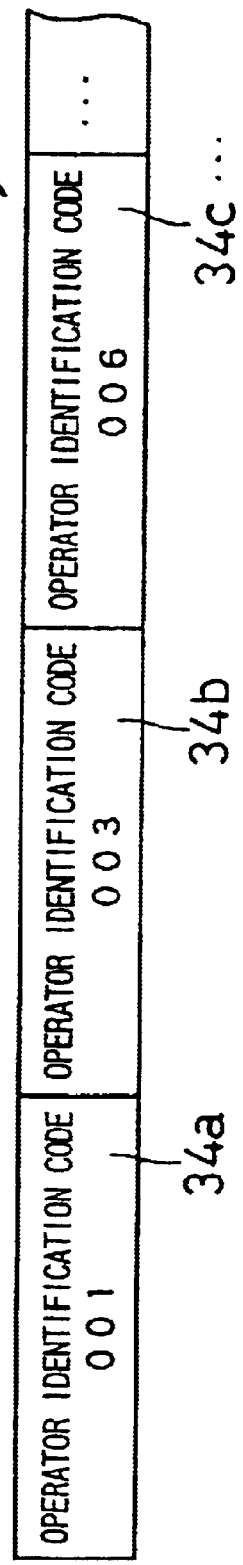
FIG. 5 is a diagram showing a department shift operation permission memory 34.

The department shift operation permission memory 34 is preloaded with the identification codes of the operators permitted to operate the department shift keys 24, as shown in FIG. 5. The memory 34 has a plurality of memory areas 34a, 34b, 34c, . . . so that it can hold the identification code of each individual operator separately even when a plurality of operators are permitted. For example, identification codes "001", "003", and "006" are stored in the areas 34a to 34c, respectively.

Figure 6:
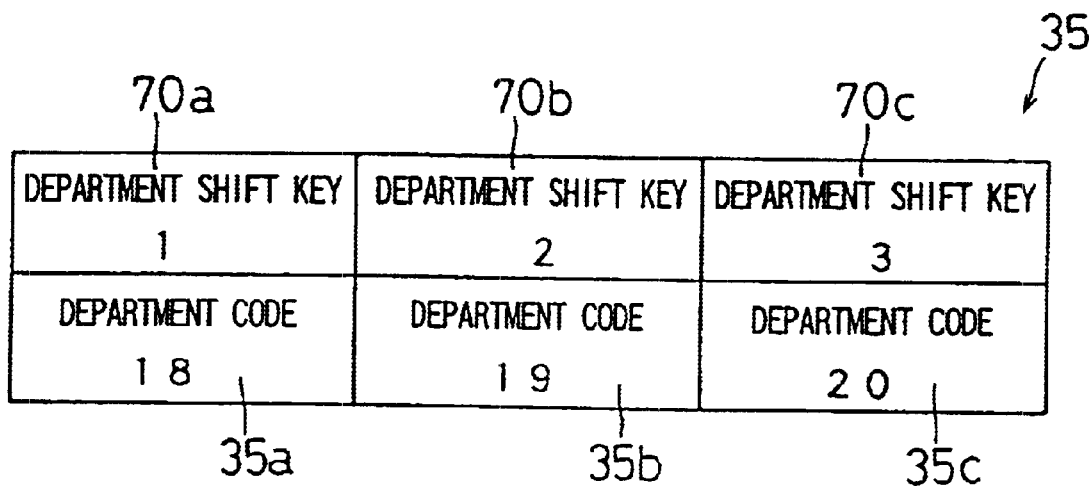
FIG. 6 is a diagram showing a department shift table 35.

The department shift table 35 stores key codes 70a, 70b, and 70c assigned to the department shift keys 24a to 24c, respectively, in a corresponding relationship to department code memory areas 35a, 35b, and 35c, as shown in FIG. 6. The department codes are used in storing the sales information registered by operating the department shift keys 24. For example, key codes "1", "2", and "3" are assigned to the department shift keys 24a, 24b, and 24c, respectively, and department codes "18", "19", and "20" are stored in the respective memory areas 35a to 35c.

Figure 7:
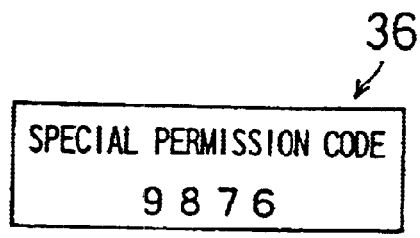
FIG. 7 is a diagram showing a department shift operation special permission code memory 36.

The department shift operation special permission code memory 36 stores a special permission code, as shown in FIG. 7, for forcefully executing the operation effected by the depression of the department shift key 24. For example, a special permission code "9876" is stored.

The totalizing memory 37 comprises a PLU file table 40 and a department file table 39, as shown in FIGS. 8A and 8B. The PLU file table 40, where sales information is totalized and stored for each PLU code, is constructed by associating the plurality of PLU codes 46 with sales information such as a sales amount totalizer 42a, a sales quantity totalizer 43a, a unit price 44a, a product name 45a, and a product department 47, as shown in FIG. 8A. For example, of the plurality of product keys 26, the product key 26 corresponding to the PLU code 46 of "0001" is depressed. Then, the unit price 44a, product name 45a, and product department 47 associated with the PLU code 46 of "0001" are read out. Further, a sales amount and a sales quantity are added and stored in the amount totalizer 42a and the quantity totalizer 43a associated with the PLU code 46 of "0001," respectively. For the product keys 26 corresponding to other PLU codes, the totalized results are stored in the same manner. Here, the product department 47 specifies the product code 41 in the department file table 39 shown in FIG. 8B.

The department file table 39, where sales information is totalized and stored for each department code 41, is constructed by associating each of the plural department codes 41 with sales information such as the amount totalizer 42b, the quantity totalizer 43b, the unit the price 44b, and the product name 45b, as shown in FIG. 8B. For example, all of the sales information memorized as "01" in the product department 47 of the PLU file table 40 is totalized and stored in the department code 41 of "01".

Here, a value of the product department 47 stored in the PLU file table 40 can be changed to the department code stored in the department shift table 35, by depressing the corresponding department shift key 24. For example, usually "01" is stored in the product department 47 of the PLU code 46 of 0001", but this can be changed to "18" by depressing the first department shift key 24a. In this case, the sales information is totalized and stored in the department code 41 of "18", instead of the department code 41 of "1", in the department file table 39.

The work memory 38 is used as an area for storing data that indicates whether the sales information has been obtained by operating the department shift keys 24, as a temporary storage area for setting and registration data, as a buffer and a flag used in performing various calculation and totalization, or as a print buffer for storing data to be printed.

Figure 9:
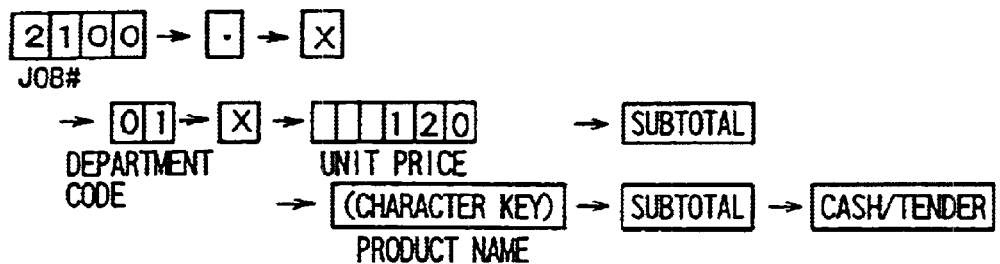
FIG. 9 is a diagram showing an operational procedure for department setting.

Next, operational procedures in the setting mode for setting various kinds of data will be described with reference to FIGS. 9 to 13. FIG. 9 is a diagram showing an operational procedure for department setting. First, a JOB code "2100." specifying the department setting is entered using the appropriate numeric keys 25 out of the plurality of keys 15 to 31 on the keyboard 11, and then the "x" key 21 is depressed. Next, the department code "01" is entered, followed by the depression of the "x" key 21; further, a unit price "120" is entered, followed by the depression of the subtotal key 30, and then the product name is entered, again followed by the depression of the subtotal key 30.

When setting unit prices and product names for different department codes, a process from an entry of the department code to the depression of the subtotal key 30 following an entry of the product name is repeated. When the entry of the unit price and product name is completed for all designated department codes, the CASH/TENDER/EXCHANGE key 31 is lastly depressed. The data thus set are stored as the department code 41, the unit price 44b, and the product name 45b in the department file table 39.

Figure 10:
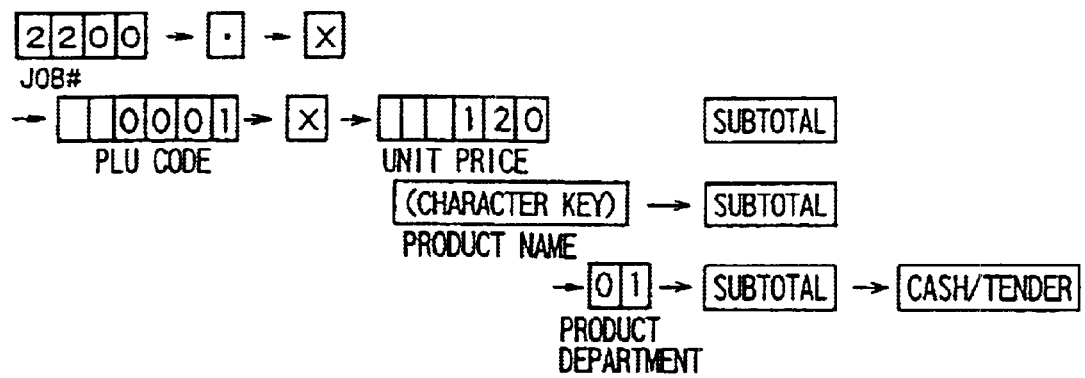
FIG. 10 is a diagram showing an operational procedure for PLU setting.

FIG. 10 is a diagram showing an operational procedure for PLU setting. First, a JOB code "2200." specifying the PLU setting is entered, followed by the depression of the "x" key 21. Next, the PLU code "0001" is entered, followed by the depression of the "x" key 21; further, the unit price "120" is entered, followed by the depression of the subtotal key 30, and then the product name is entered, again followed by the depression of the subtotal key 30. Then, the product department "01" is entered, followed by the depression of the subtotal key 30.

When setting unit prices, product names, and product departments for different PLU codes, a process from the entry of the PLU code to the depression of the subtotal key 30 following the entry of the product department is repeated. When the entry of the unit prices, product names, and product departments is completed for all designated PLU codes, the CASH/TENDER/EXCHANGE key 31 is depressed. The data thus set are stored as the PLU code 46, the unit price 44a, the product name 45a, and the product department 47 in the PLU file table 40.

Figure 11:
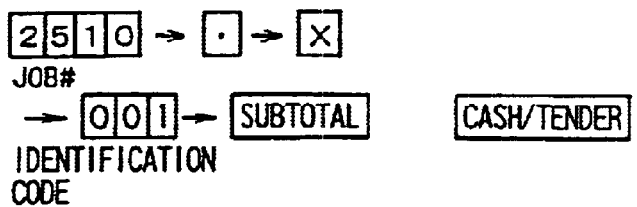
FIG. 11 is a diagram showing an operational procedure for setting an identification code of an operator permitted to operate department shift keys 24.

FIG. 11 is a diagram showing an operational procedure for setting the identification code of an operator permitted to operate the department shift keys 24. First, a JOB code "2510." specifying the setting of the identification code of an operator permitted to operate the department shift keys 24 is entered, and then the "x" key 21 is depressed. Further, the identification code "001" of the operator is entered, followed by the depression of the subtotal key 30.

When setting the identification codes of different operators, the entry of the identification code and the depression of the subtotal key 30 are repeated. When the entry of all designated identification codes is completed, the CASH/TENDER/EXCHANGE key 31 is depressed. The data thus set are stored in the respective memory areas, 34a, 34b, 34c, . . . of the department shift operation permission memory 34.

FIG. 12 is a diagram showing an operational procedure for setting the special permission code used to forcefully execute the operation effected by the depression of the department shift key 24. First, JOB code "2511." specifying the setting of the special permission code is entered, followed by the depression of the "x" key 21. Then, a special permission key "9876" is entered, and finally the CASH/TENDER/EXCHANGE key 31 is depressed. The data thus set is stored in the department shift operation special permission code memory 36.

FIG. 13 is a diagram showing an operational procedure for setting the department shift table 35. First, a JOB code "2190." specifying the setting of the department shift table 35 is entered, and then the "x" key 21 is depressed. Next, a department shift key code "1" is entered, followed by the depression of the "x" key 21, and then a department code "18" is entered, followed by the depression of the subtotal key 30.

When setting different department codes, a process from the entry of the department shift key code to the depression of the subtotal key 30 following the entry of the department code is repeated. When the entry of all designated department codes is completed, the CASH/TENDER/EXCHANGE key 31 is depressed. The data thus set are stored in the respective memory areas 35a to 35c of the department shift table 35.

Figures 14, 15:
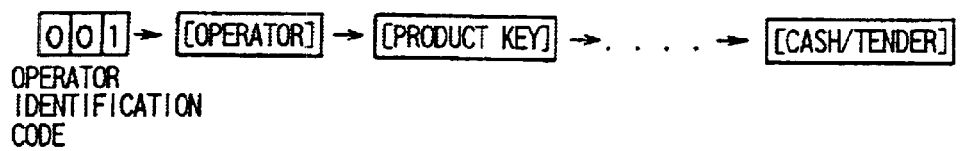
FIG. 14 is a diagram showing an operational procedure for PLU ordinary registration.
FIG. 15 is a diagram showing an operational procedure example, a display example, and a print example for PLU ordinary registration.

Next, operational procedures in a registration mode for registering various kinds of data will be described with reference to FIGS. 14 to 21. FIG. 14 is a diagram showing an operational procedure for PLU ordinary registration. (ordinary registration mode) effecting ordinary registration of sales information. FIG. 15 is a diagram showing an operational procedure example, a display example, and a print example in this mode.

To initiate the PLU ordinary registration, first the identification code "001" of the operator is entered using the numeric keys 25 on the keyboard 11, and then the OPERATOR key 27 is depressed. The entered identification code is stored in the operator memory 33, and a description indicating the operator identification code, for example, "OPERATOR 001", is displayed on the LCD panel 12.

Next, of the plurality of product keys 26, the key 26 corresponding to the product to be registered is depressed. The PLU file table 40 is searched for the PLU code 46 that matches the PLU code associated with the depressed product key 26, and the corresponding unit price 44a, the product name 45a, and the product department 47 are read out; at the same time, the amount and quantity are totalized for each PLU code 46 by the amount totalizer 42b and quantity totalizer 43b, respectively.

Further, the amount and quantity are totalized in the department file table 39 by the amount totalizer 42b and quantity totalizer 43b for each department code 41 specified by the readout product department 47. The unit price and product name thus read out are displayed on the LCD panel 12. The unit price and product name are also printed out by the printer 8.

When there is more than one product to be registered, the corresponding product key 26 is repeatedly depressed. When entry is completed for all products, the CASH/TENDER/EXCHANGE key 31 is depressed. When this is done, a description indicating a cash sale, for example, "CASH", and the amount to be billed, i.e., the total purchase amount plus tax, are displayed on the LCD panel 12. Further, the tax amount against the total purchase amount, the description indicating a cash sale, and the amount to be billed, calculated by adding the tax to the total purchase amount, are printed out by the printer 8.

FIG. 16 is a diagram showing an operational procedure for PLU special registration (special registration mode) effecting special registration of sales information. FIG. 17 is a diagram showing an operational procedure example, a display example, and a print example in this mode. First, the identification code of the operator is entered, followed by the depression of the OPERATOR key 27. A description indicating the operator identification code is displayed on the LCD panel 12.

Next, of the plurality of department shift keys 24, the desired department shift key 24 is depressed. In this way, the special registration process is specified. Then, of the plurality of product keys 26, the key 26 corresponding to the product to be registered is depressed. The PLU file table 40 is searched for the PLU code 46 that matches the PLU code associated with the depressed product key 26, and the corresponding unit price 44a, product name 45a, and product department 47 are read out; at the same time, the amount and quantity are totalized for each PLU code 46. At this time, the value of the product department is changed to the department code stored in one of the areas 35a to 35c of the department shift table 35 corresponding to the depressed department shift key 24.

Further, the amount and quantity are totalized in the department file table 39 for each department code 41 specified by the thus readout and changed product department 47. A description indicating a special registration, for example, "DEPARTMENT SHIFT 1", is displayed on the LCD panel 12 together with the readout unit price and product name. The description indicating a special registration, the unit price, and the product name are also printed out by the printer 8.

When there is more than one product to be registered, the corresponding product key 26 is repeatedly depressed. The values of all product departments 47 at this time are changed to the department codes stored in the areas 35a to 35c of the department shift table 35 corresponding to the depressed department shift keys 24. Therefore, sales information associated with a special customer or a special purchaser can be collectively stored together in a specific area.

When entry is completed for all products, the CASH/TENDER/EXCHANGE key 31 is depressed. When this is done, a description indicating a cash sale and the amount to be billed, i.e., the total purchase amount plus tax, are displayed on the LCD panel 12. Further, the tax amount against the total purchase amount, the description indicating a cash sale, and the amount to be billed, calculated by adding the tax to the total purchase amount, are printed out by the printer 8.

FIG. 18 is a diagram showing an operational procedure example and a display example in case where, at the time of the above PLU special registration, the operator identification code stored in the operator memory 33 does not match any of the operator identification codes prestored in the department shift operation permission memory 34. First, an operator identification code "002" is entered, followed by the depression of the OPERATOR key 27. The LCD panel 12 displays a description indicating the operator's identification code. The entered identification code is stored in the operator memory 33.

Next, of the plurality of department shift keys 24, the desired department shift key 24 is depressed, but in this case it is determined that the identification code stored in the operator memory 33 does not match any of the identification codes prestored in the department shift operation permission memory 34, and a message indicating the prohibition of the special registration process, for example, "DEPARTMENT SHIFT PROHIBITED", is displayed on the LCD display panel 12.

Figures 19, 20:
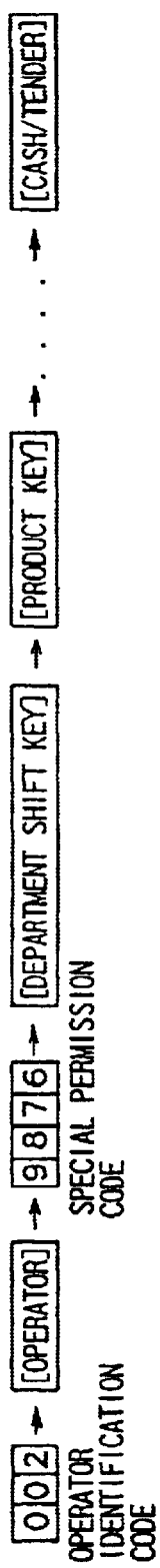
FIG. 19 is a diagram showing an operational procedure for forcefully executing the PLU special registration process when, in PLU special registration, the identification code stored in the operator memory 33 does not match any of the identification codes prestored in the department shift operation permission memory 34.
FIG. 20 is a diagram showing an operational procedure example, a display example, and a print example when forcefully executing the PLU special registration process.

FIG. 19 is a diagram showing an operational procedure for forcefully executing the PLU special registration process when, at the time of the above PLU special registration, the operator identification code stored in the operator memory 33 does not match any of the operator identification codes prestored in the department shift operation permission memory 34. FIG. 20 is a diagram showing an operational procedure example, a display example, and a print example in this case.

First, the operator identification code "002" is entered, followed by the depression of the OPERATOR key 27. The LCD panel 12 displays a description indicating the operator identification code. At this time, the identification code stored in the operator memory 33 does not match any of the identification codes prestored in the department shift operation permission memory 34.

Next, the special permission code "9876" is entered. This allows forceful execution of the PLU special registration process. Then, of the plurality of department shift keys 24, the desired department shift key 24 is repeatedly depressed, and then, of the plurality of product keys 26, the product key 26 corresponding to the product to be registered is depressed. When there is more than one product to be registered, the next corresponding key 26 is depressed. When the entry of all products is completed, the CASH/TENDER/EXCHANGE key 31 is lastly depressed.

Figures 21, 22:
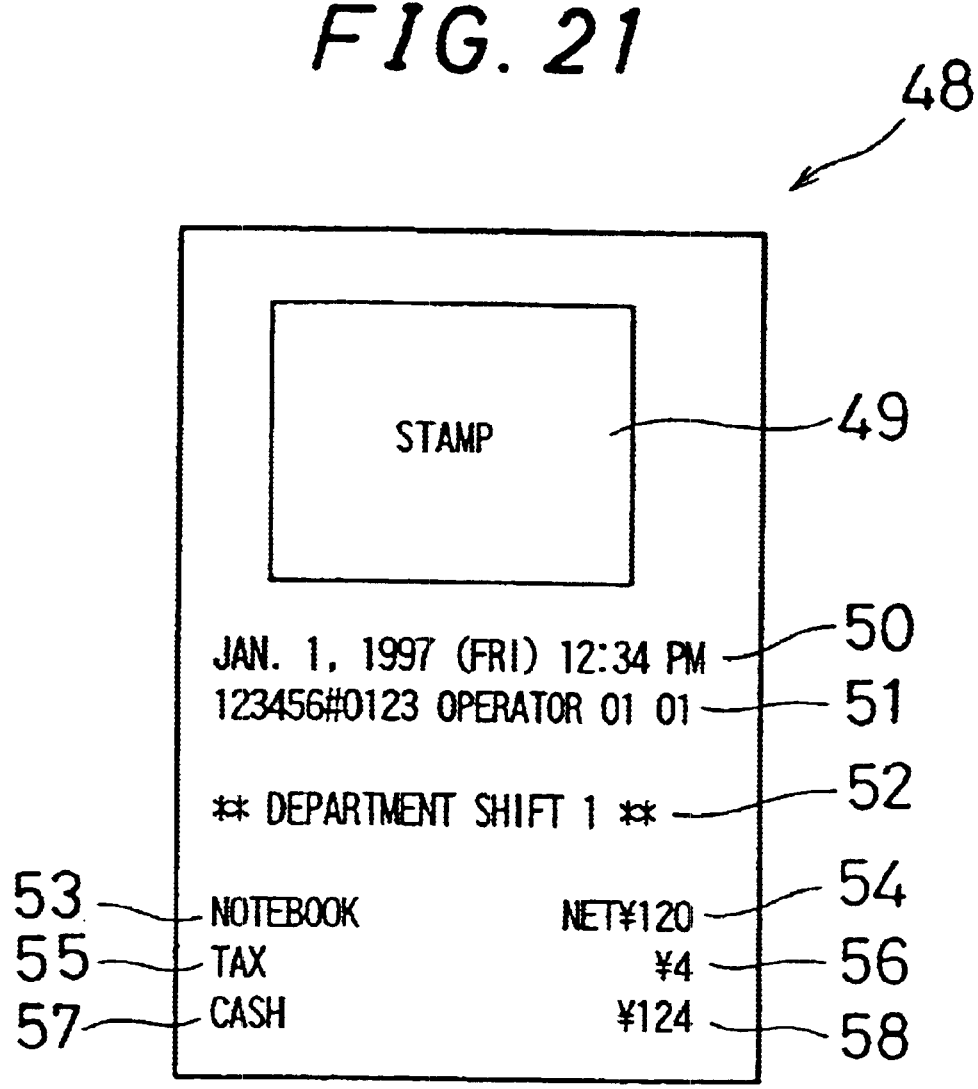
FIG. 21 is a diagram showing an example of a receipt 48 printed out at a time of PLU special registration.
FIG. 22 is a diagram showing an operational procedure in a check/settlement mode for checking and settling registered data.

FIG. 21 is a diagram showing an example of the receipt 48 printed out at the time of PLU special registration. A description indicating the special registration is printed on the receipt 48. For example, "DEPARTMENT SHIFT 1" is printed in the mode area 52.

The receipt 48 also has a stamp area 49 where various messages are printed, an output time area 50 where an output time of the receipt 48 is printed, and an identification area 51 where the operator's identification code, etc. are printed, these areas being located above a mode area 52; below the mode area 52 are printed a product name 53 with a purchase amount 54, a tax description 55 with a tax amount 56, and a cash sale description 57 with a total sales amount 58 including the tax.

Figure 23:
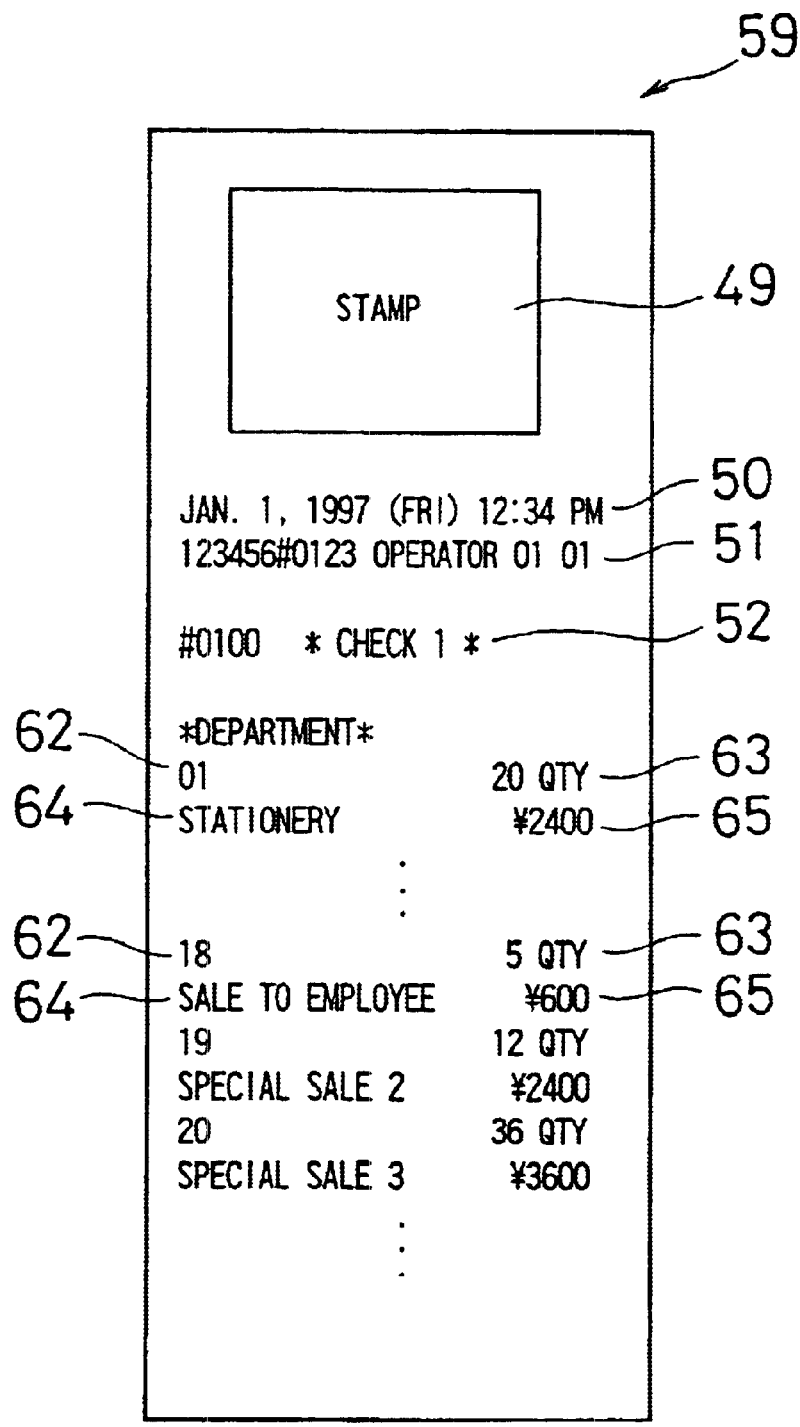
FIG. 23 is a diagram showing an example of a receipt printed out in the check/settlement mode.

FIG. 22 is a diagram showing an operational procedure in a check/settlement mode for checking and settling the registered data. FIG. 23 shows an example of a receipt printed out in this mode. To execute the check/settlement mode, the CASH/TENDER/EXCHANGE key 31 is depressed. With this operation, the receipt 59 is printed out by the printer 8.

On the receipt 59, a description indicating the check/settlement mode is printed in the mode area 52. Above the mode area 52 are provided the stamp area 49, the output time area 50, and the identification area 51, as in the case of the receipt 48. A department area 62 with the department code printed alongside a total purchase quantity 63, and each product name 64 with a total purchase amount 65 are printed below the mode area 52.

Figure 24:
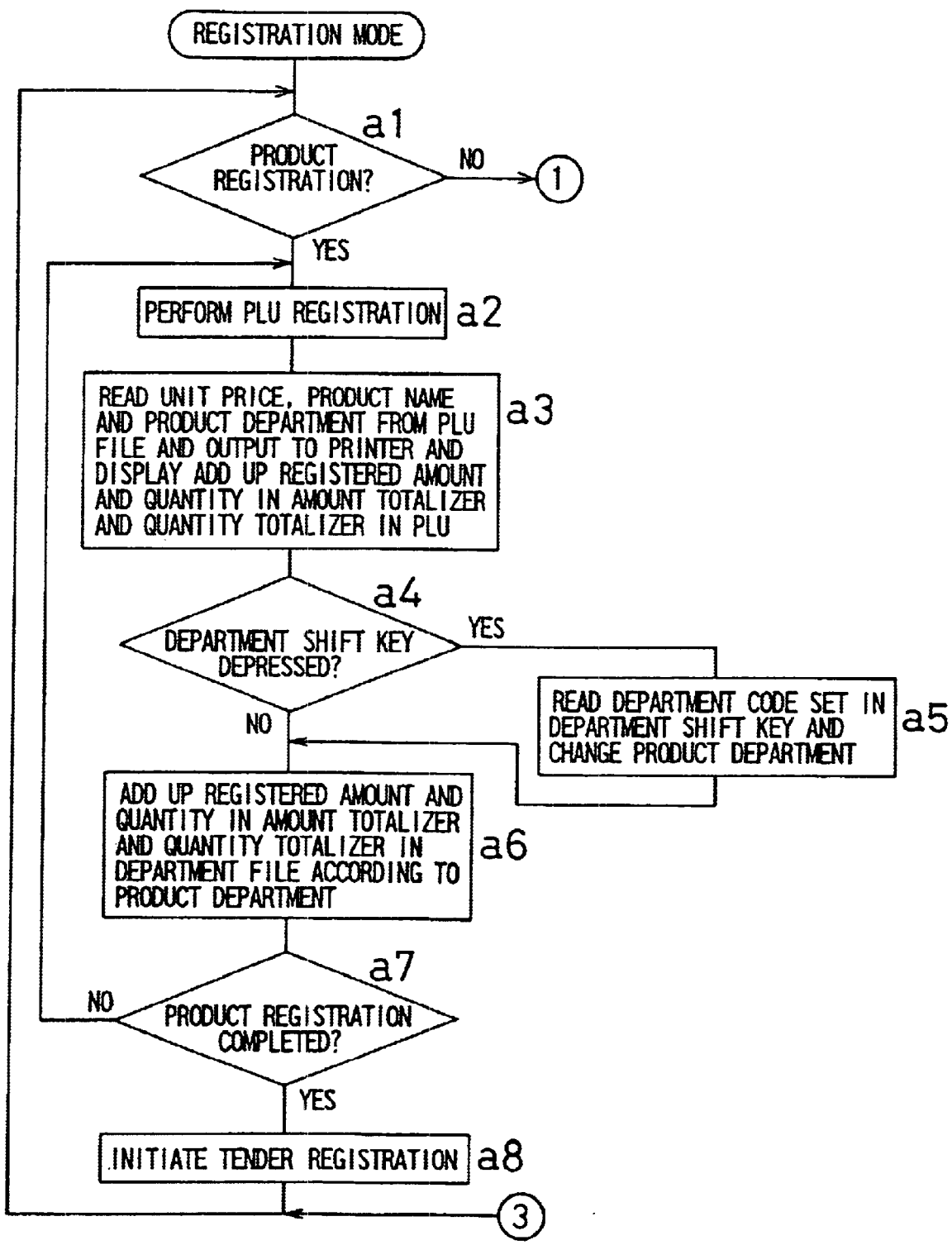
FIG. 24 is a flowchart illustrating an operation of the electronic cash register 1 in registration mode.
Figure 25:
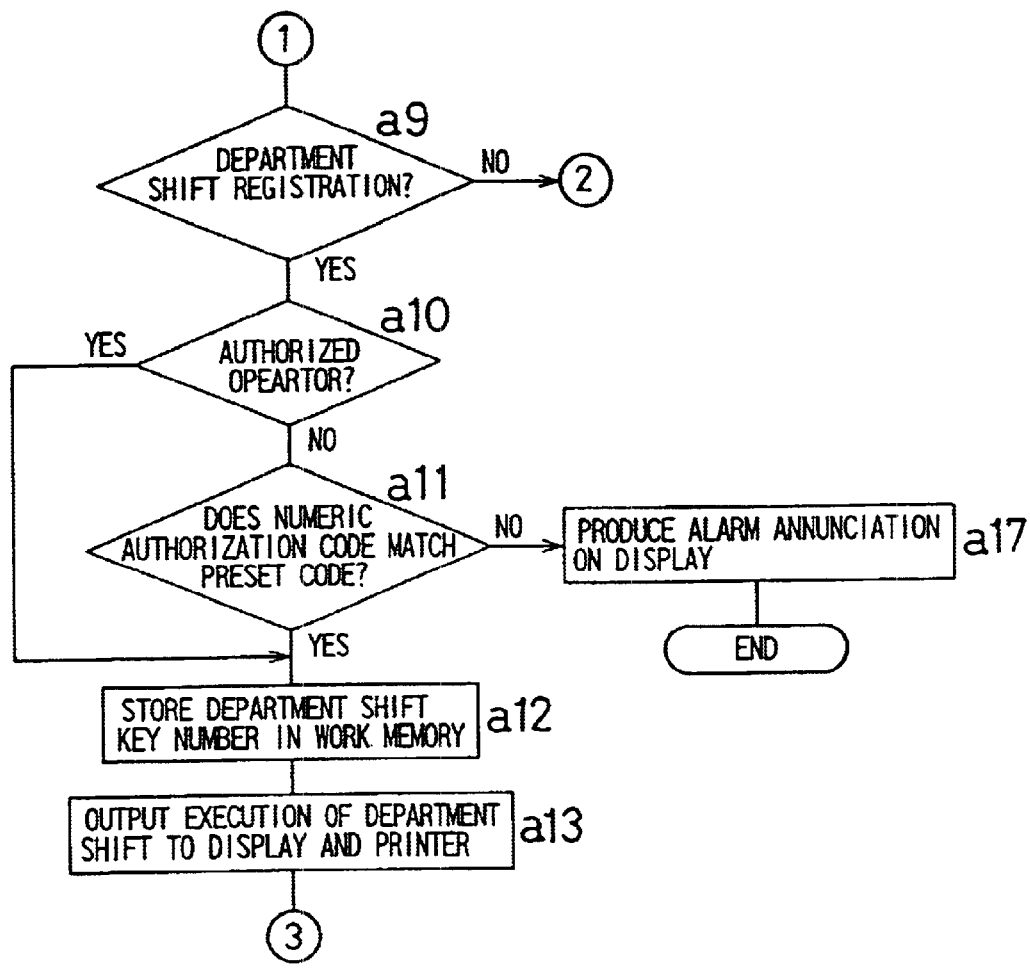
FIG. 25 is a flowchart illustrating the operation of the electronic cash register 1 in registration mode.
Figure 26:
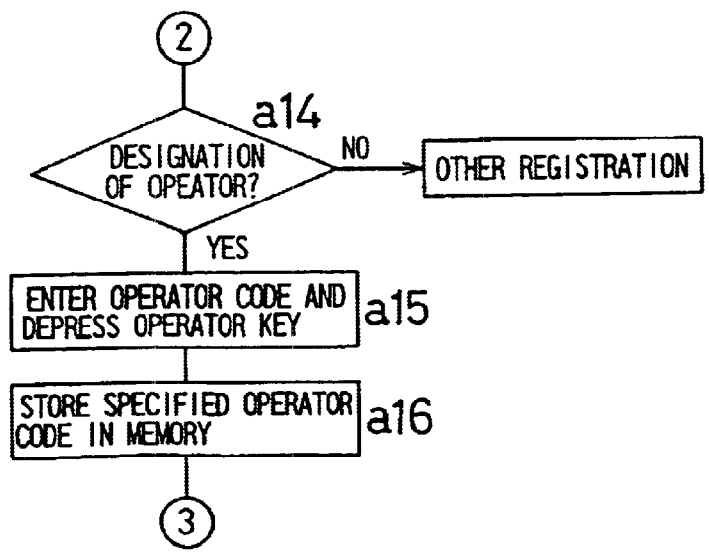
FIG. 26 is a flowchart illustrating the operation of the electronic cash register 1 in registration mode.

FIGS. 24 to 26 are flowcharts illustrating an operation of the electronic cash register 1 in the registration mode. In step a1, a decision is made in the CPU 2 as to whether a requested registration is a product registration or not. This decision can be made based on the depression of any one of the plurality of product keys 26. If it is a product registration, the process proceeds to step a2; otherwise, the process jumps to step a9.

In step a2, execution of the PLU registration process is initiated. In step a3, the CPU 2 searches the PLU file table 40 for the PLU code 46 that matches the PLU code associated with the depressed product key 26, and reads out the corresponding unit price 44a, product name 45a, and product department 47. The thus readout unit price and product name are displayed on the LCD panel 12, and printed out by the printer 8. The amount to be registered is added in the amount totalizer 42a and the quantity to be registered is added in the quantity totalizer 43a.

In step a4, a decision is made in the CPU 2 as to whether any one of the department shift keys 24 is depressed, that is, whether the PLU special registration process is specified or not. If the answer is YES, that is, if the PLU special registration process is specified, the process proceeds to step a5; if the answer is NO, that is, if PLU special registration process is not specified, the process proceeds to step a6.

In step a5, a value of the product department 47 is changed. More specifically, it is changed to the department code stored in one of the memory areas 35a to 35c of the department shift table 35 corresponding to the depressed department shift key 24a, 24b, or 24c. After this change, the process proceeds to step a6.

In step a6, the amount and quantity are totalized by the amount totalizer 42b and quantity totalizer 43b for each department code 41 in the department file table 39 specified by the product department 47. In step a7, a decision is made in the CPU 2 as to whether the registration of all products is completed. This decision can be made based on whether the CASH/TENDER/EXCHANGE key 31 is depressed. If the registration has been completed, the process proceeds to step a8; otherwise, the process returns to step a2. In step a8, a tender registration process is initiated. When this process is completed, the process returns to step a1.

In step a9, a decision is made in the CPU 2 as to whether any one of the department shift keys 24 is depressed. If any one of department shift key 24 is depressed, the process proceeds to step a10; otherwise, the process jumps to step a14.

In step a10, a decision is made in the CPU 2 as to whether the operator is an operator permitted to operate the department shift keys 24. This decision can be made based on a result of a comparison between the identification code stored in the operator memory 33 and the identification codes prestored in the department shift operation permission memory 34. If the identification codes stored in the memories 33 and 34 match, it is determined that the operator is permitted to perform the operation, and the process proceeds to step a12; if the identification codes do not match, it is determined that the operator is not permitted to perform the operation, and the process proceeds to step a11.

In step a11, the special permission code is entered, which is compared in the CPU 2 with the special permission code prestored in the department shift operation special permission code memory 36, to determine whether they match. If they match, the process proceeds to step a12; if they do not match, the process proceeds to a17, where an alarm is issued to terminate the process. In this way, an indication notifying that the operation by the department shift key 24 is disallowed is displayed on the LCD panel 12. Alternatively, provisions may be made to generate an alarm sound from the buzzer circuit 5.

In step a12, the department shift key code corresponding to the department shift key 24 depressed in step a9 is stored in the work memory 38. In step a13, a description indicating the special registration effected by the operation of the department shift key 24 is displayed on the LCD panel 12 and printed out by the printer 8. When the display and printout are completed, the process returns to step a1.

In step a14, a decision is made in the CPU 2 as to whether the operator's identification code is entered or not. If the identification code is entered, the process proceeds to step a15; otherwise, the process proceeds to other registration. In step a15, the OPERATOR key 27 is depressed following the entry of the operator's identification code. In step a16, the identification code is stored in the operator memory 33. When this operation is completed, the process returns to step a1.

As described above, according to the embodiment of the present invention, usually the sales information on registered merchandise is totalized and stored in sales information storage means which is an area of the department file table 39 specified in the product department 47 by executing the ordinary registration mode; however, when the special registration process is specified by depressing one of the department shift keys 24, the value of the product department 47 is changed by executing the special registration mode and all sales information is totalized and stored in special sales information storage means which is the area of the department file table 39 specified by the thus changed value.

Special sales information associated with special customers, special purchasers, etc. and ordinary sales information associated with ordinary customers, ordinary purchasers, etc. can be registered easily and simply in like manner. Such the electronic cash register 1 is useful in performing a process, for example, for tax declaration. Furthermore, all of the special sales information during a period for which the special registration process is specified can be totalized and stored together, separately from ordinary sales information.

Further, since provisions are made to allow only pre-designated specific operators to execute the special registration mode by comparing the operator identification codes, ordinary sales information is prevented from being erroneously stored in the special sales information storage area and, likewise, special sales information is prevented from being erroneously stored in the ordinary sales information storage area.

Moreover, when an operator other than the specific operators has attempted to execute the special registration mode, information that the execution of the special registration mode is disallowed is displayed or issued by means of the LCD panel 12 or the buzzer circuit 5 so that an erroneous operation can be avoided.

Provisions are also made to allow even an operator other than the specific operators to execute the special registration mode if he knows the special permission code. Therefore, an operator, such as a manager who has the authority to know the special permission code, can easily execute the special registration mode in case of emergency.

Furthermore, since sales information is displayed or printed out, the operator can easily check the result of totalization of the ordinary sales information and special sales information. Moreover, by checking the information printed in the mode area 52 or displayed on the display, it is possible to easily confirm that the output sales information is the special sales information obtained by executing the special registration mode.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic cash register comprising:
    registration means for registering sales information of a plurality of items of merchandise;
    sales information storage means for storing the sales information; and
    control means for causing execution of an ordinary registration mode in which the sales information registered by the registration means is supplied to the sales information storage means;
    the electronic cash register further comprising:
        special registration process specifying means for specifying that special sales information of special items be subjected to a special registration process;
        wherein the sales information storage means includes a first portion for storing sales information associated with each item, and a second portion for storing sales information associated with each of a plurality of purchasers, the second portion including a first sub-portion for storing sales information associated with respective ordinary purchasers and a second sub-portion for storing sales information associated with respective special purchasers,
        wherein, when the special registration is specified by the special registration process specifying means, the control means causes execution of a special registration mode in which the sales information registered by the registration means is supplied to the second sub-portion for storing sales information of respective special purchasers, and
        wherein the sales information stored in the first and second sub-portions includes a total quantity and a total price for at least one item,
        thereby allowing the total quantity and the total price of the at least one item purchased by both ordinary and special purchasers to be output from said respective first and second sub-portions of said sales information storage means.

2. The electronic cash register of claim 1, the electronic cash register comprising:
    first identification code storage means for prestoring an identification code of a predetermined operator;
    second identification code storage means for storing an operator identification code entered in the execution of the special registration mode;
    identification code comparing means for comparing the identification codes stored in the first and second identification code storage means with each other; and
    special registration mode permitting means for permitting the execution of the special registration mode when the identification codes match with each other.

3. The electronic cash register of claim 2, the electronic cash register comprising informing means for informing that the special registration mode is disallowed when the identification codes do not match.

4. The electronic cash register of claim 2, the electronic cash register comprising:
    first designation code storage means for prestoring a designation code for forcefully executing the special registration mode;

second designation code storage means for storing a designation code entered in the execution of the special registration mode;

designation codes comparing means for comparing the designation codes stored in the first and second designation code storage means with each other; and special registration mode forceful execution means for forcefully executing the special registration mode if the designation codes match with each other even when the operator identification codes do not match.

5. The electronic cash register of claim 1, the electronic cash register comprising output means for outputting the sales information of respective ordinary and special purchasers stored in the sales information storage means.

6. The electronic cash register of claim 5, wherein the output means outputs the sales information stored in the second sub-portion for storing sales information of respective special purchasers, together with data indicating that the information has been obtained by executing the special registration mode.

7. The electronic cash register of claim 1, wherein the sales information associated with each item stored in the first portion of the sales information storage means includes an attribute having a type selected from the group consisting of an ordinary type and a special type, the attribute type being specified by the special registration process specifying means, and wherein, when the attribute of an item to be registered is specified as the ordinary type, the control means causes execution of the ordinary registration mode in which the sales information of the item is supplied to the first sub-portion of the sales information storage means for storing sales information of a respective ordinary purchaser and, when the attribute of an item to be registered is specified as the special type, the control means causes execution of the special registration mode in which the sales information of the item is supplied to the second sub-portion of the sales information storage means for storing sales information of a respective special purchaser.

* * * * *